United States Patent
Choi

(10) Patent No.: US 8,434,595 B2
(45) Date of Patent: May 7, 2013

(54) VALVE BODY COVER OF AUTOMATIC TRANSMISSION

(75) Inventor: Seunghun Choi, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 393 days.

(21) Appl. No.: 12/887,771

(22) Filed: Sep. 22, 2010

(65) Prior Publication Data

US 2011/0240142 A1 Oct. 6, 2011

(30) Foreign Application Priority Data

Mar. 31, 2010 (KR) .................. 10-2010-0029200

(51) Int. Cl.
*F16N 31/00* (2006.01)
*F01M 11/04* (2006.01)
*G01F 23/04* (2006.01)

(52) U.S. Cl.
USPC ............ 184/1.5; 184/106; 251/144; 251/215; 33/731

(58) Field of Classification Search .................. 251/144, 251/215, 218, 339; 33/722, 730, 731; 73/290 R; 184/1.5, 106

See application file for complete search history.

(56) References Cited

U.S. PATENT DOCUMENTS

| | | | | |
|---|---|---|---|---|
| 5,014,445 A | * | 5/1991 | Martell | 33/731 |
| 5,086,943 A | * | 2/1992 | Poskie | 33/731 |
| 5,325,981 A | * | 7/1994 | Klomhaus et al. | 33/730 |
| 5,808,187 A | * | 9/1998 | Gooden et al. | 73/290 R |
| 5,829,153 A | * | 11/1998 | Hitchock | 33/731 |
| 6,301,947 B1 | * | 10/2001 | McCombs, Jr. | 73/290 R |
| 6,886,608 B2 | * | 5/2005 | Jacob | 184/1.5 |
| 7,308,970 B2 | * | 12/2007 | Holub | 184/1.5 |
| 2003/0150125 A1 | * | 8/2003 | Dougherty et al. | 33/722 |
| 2007/0170390 A1 | * | 7/2007 | Jessberger | 251/215 |
| 2008/0135340 A1 | * | 6/2008 | Schlicker et al. | 184/106 |
| 2008/0229602 A1 | * | 9/2008 | Herr et al. | 33/722 |
| 2009/0049706 A1 | * | 2/2009 | Hart et al. | 33/731 |

FOREIGN PATENT DOCUMENTS

| | | |
|---|---|---|
| KR | 2002-0009709 A | 2/2002 |
| KR | 10-2007-0044649 A | 4/2007 |
| KR | 10-2007-0050595 A | 5/2007 |
| KR | 10-2008-0038749 A | 5/2008 |

* cited by examiner

*Primary Examiner* — John Rivell
(74) *Attorney, Agent, or Firm* — Morgan, Lewis & Bockius LLP

(57) ABSTRACT

A valve body cover of an automatic transmission, may include a cover plate having a hole, an oil level plug having a cap detachably mounted onto the cover plate from the outside of the cover plate and an insertion extended from the cap and selectively inserted into the hole of the cover plate, and rotational pressing members formed in the insertion of the oil level plug and the cover plate respectively to press the cap against the cover plate while the insertion of the oil level plug inserted in the hole is rotated relatively with respect to the cover plate.

9 Claims, 6 Drawing Sheets

VALVE BODY COVER OF AUTOMATIC TRANSMISSION

CROSS-REFERENCE TO RELATED APPLICATIONS

The present application claims priority to Korean Patent Application Number 10-2010-0029200 filed Mar. 31, 2010, the entire contents of which application is incorporated herein for all purposes by this reference.

BACKGROUND OF THE INVENTION

1. Field of the Invention

The present invention relates to the structure of an automatic transmission equipped with a vehicle, and more particularly to a valve body cover of an automatic transmission.

2. Description of Related Art

The valve body of automatic transmission is a device that can control the operation of the automatic transmission, using hydraulic pressure, which is disposed in a transmission case of the automatic transmission and of which the outer side is covered and protected by a valve body cover mounted on the transmission case.

The valve body cover is provided with an oil level plug to check whether an appropriated amount of oil exists in the transmission case.

In the related art, a nut is welded where the oil level plug is mounted in valve body covers made of metal and a nut is inserted in valve body covers made of plastic, in order to mount the oil level plug, which is a bolt type, in the nut with predetermined torque.

Theses structure, however, had a problem that the nut is likely to separate from the valve body cover after a long time and additional works are required due to inserting or welding the nut in manufacturing the valve body cover, such that the manufacturing cost increases and the weight is increased by the metal nut.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a valve body cover of an automatic transmission that makes it possible to reduce the manufacturing works, the manufacturing cost, and the weight, and improve durability, by mounting an oil level plug without additionally inserting or welding a nut.

In an aspect of the present invention, the valve body cover of an automatic transmission may include a cover plate having a hole; an oil level plug having a cap detachably mounted onto the cover plate from the outside of the cover plate and an insertion extended from the cap and selectively inserted into the hole of the cover plate; and rotational pressing members formed in the insertion of the oil level plug and the cover plate respectively to press the cap against the cover plate while the insertion of the oil level plug inserted in the hole may be rotated relatively with respect to the cover plate.

The valve body cover of the automatic transmission may further include a sealing member which may be disposed between the cap and the cover plate and compressed by the cap for sealing a gap formed between the cap and the cover plate while the cap may be rotatably coupled to the cover plate, wherein the sealing member may be formed in a ring to be fitted around the insertion, wherein the cover plate includes a receiving groove formed along the hole of the cover place to retain the sealing member therein, and wherein a locking protrusion may be formed on an inner circumference of the receiving groove to couple the sealing member in the receiving groove.

The rotational pressing members may include a locking protrusion disposed with a predetermined distance from the cap in a longitudinal direction of the insertion and protruding from the insertion radially from the longitudinal direction of the insertion; a receiving hole formed in the cover plate and extending from the hole of the cover plate outwards so as to allow the locking protrusion of the insertion to pass through the receiving hole at a predetermined position of the cover plate; and a spiral protrusion spirally protruding from the cover plate toward the inside of the cover plate such that the locking protrusion passing through the receiving hole moves toward the inside of the cover plate in the longitudinal direction of the insertion while the locking protrusion of the insertion rotates along the spiral protrusion.

The spiral protrusion may spirally protrude from the cover plate toward the inside of the cover plate with a predetermined slope with respect to the cover plate along a circumferential direction of the hole.

The valve body cover of the automatic transmission may include a rotation range restricting member that may be disposed between the oil level plug and the cover plate to restrict a rotation of the oil level plug rotating with respect to the cover plate within a predetermined range such that the locking protrusion of the insertion spirally move along the spiral protrusion with the predetermined slope and may be mounted to the spiral protrusion, wherein the rotation range restricting member has a restricting leg protruding from the cap with a predetermined length; and an arc locking slot formed on the cover plate such that the restricting leg may be inserted and locked therein to mount the locking protrusion onto the spiral protrusion, wherein the rotation range restricting member further includes an arc guide slot which may be integrally formed to one end portion of the arc locking slot, wherein a ridge portion may be formed between the arc guide slot and the arc locking slot to make a thickness of the arc guide slot smaller than the thickness of the arc locking slot, and wherein the restricting leg may be elastically biased against the ridge portion of the arc guide slot such that the restricting leg sliding along the arc guide slot may be locked into the arc locking slot when the restricting leg passes over the ridge portion into the arc locking slot.

The cap may be formed in a circular plate and the restricting leg protrudes downwards from an outer circumference of the cap toward the cover plate with the predetermined length.

A tool groove may be formed approximately at the center of the cap to insert a tool thereto and apply a rotational force to rotate the oil level plug with respect to the cover plate.

The present invention has a structure that makes it possible to combine or separate an oil level plug with or from cover plate itself of a valve body cover, without additionally inserting or welding a specific nut. Therefore, it is possible to reduce manufacturing works and manufacturing cost of a valve body cover of an automatic transmission and also reduce the weight and improve durability with stable sealing, by changing the structure of the oil level plug.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
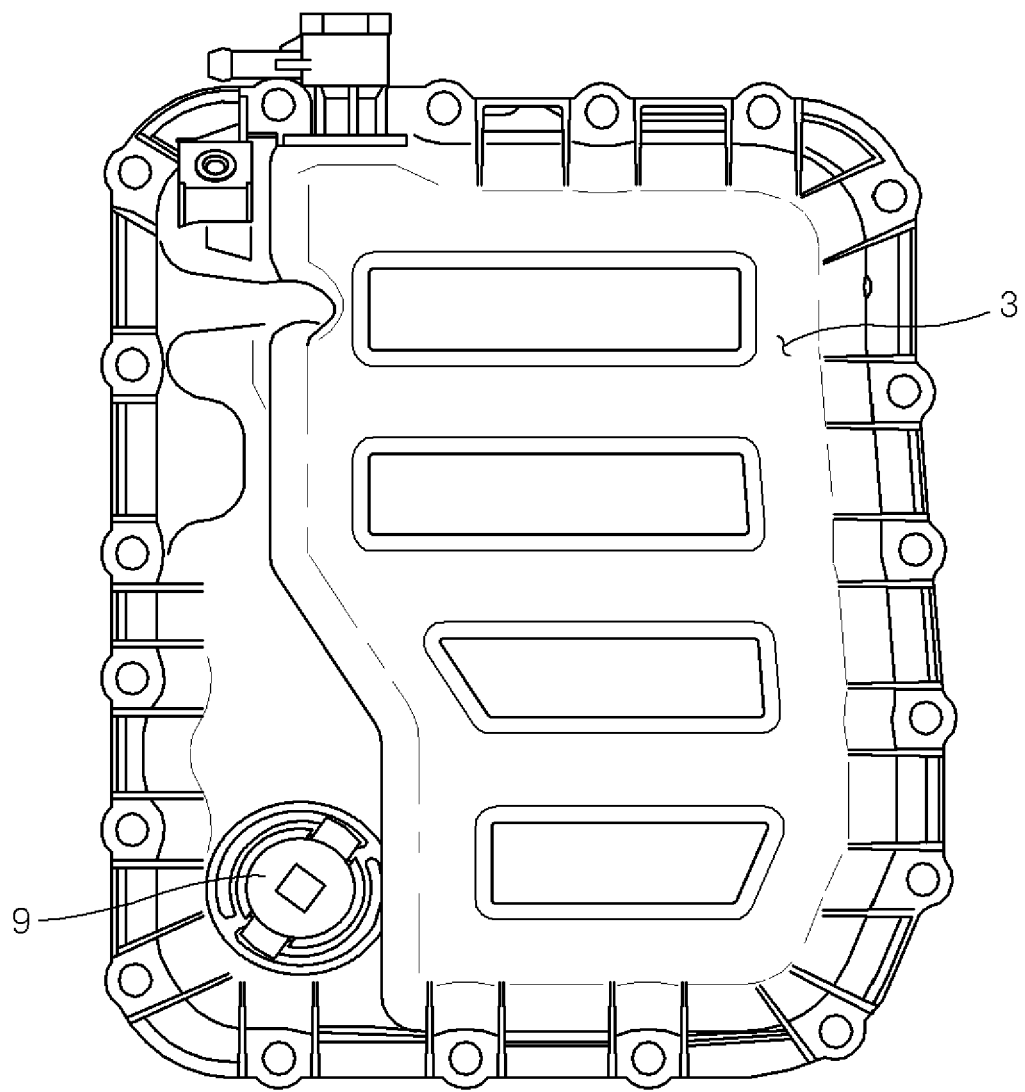
FIG. 1 is a showing a valve body cover of an automatic transmission according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 4, a valve body cover of an automatic transmission according to an exemplary embodiment of the present invention includes a cover plate 3 having a hole 1 and mounted to a transmission case to cover a valve body, an oil level plug 9 having a cap 5 mounted to be positioned outside cover plate 3 and an insertion 7 that is inserted into hole 1 from cap 5, a rotational pressing member formed in oil level plug 9 and cover plate 3 to gradually move cap 5 to cover plate 3 when oil level plug 9 is rotated relatively to cover plate 3, with insertion 7 in hole 1, and a sealing member 11 compressed between cap 5 and cover plate 3 for sealing, when cap 5 is moved to cover plate 3.

That is, the portion implemented by a nut in the related art is integrally formed with cover plate 3 and oil level plug 9 that was a bolt type in the related art is modified, such that oil level plug 9 is assembled and disassembled only by one rotation at the most with respect to cover plate 3.

It is preferable that cover plate 3 is made of plastic to achieve the complicate shape around hole 1 at one time by injection molding and oil level plug 9 assembled with it may be made of similar plastic.

In the present embodiment, the rotational pressing member includes locking protrusions 13 protruding radially from insertion 7, receiving holes 15 extending from hole 1 of cover plate 3 to allow locking protrusions 13 to pass through the receiving holes 15 at predetermined positions, spiral protrusions 17 spirally protruding toward the inside of cover plate 3 such that locking protrusions 13 passing through receiving holes 15 can move toward the inside of cover plate 3 while rotating with cover plate 3.

Figure 5:
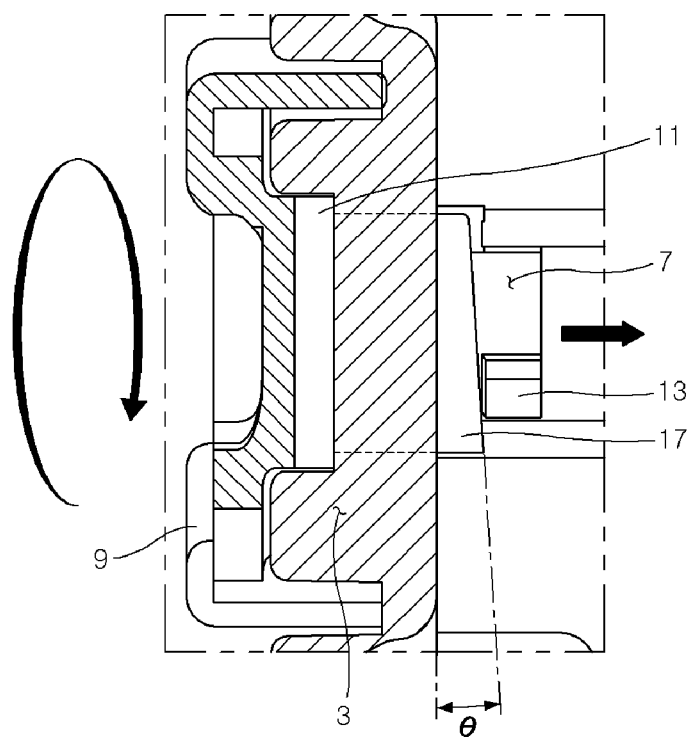
FIG. 5 is a cross-sectional view illustrating the operation the oil level plug mounted on the cover plate.

Therefore, when insertion 7 is inserted in hole 1, with locking protrusion 13 positioned to pass through receiving holes 15, and the cap 5 is rotated, as shown in FIG. 5, locking protrusions 13 spirally moves along spiral protrusions 17 and cap 5 moves to cover plate 3.

An exemplary embodiment of the present invention may include a receiving groove 20 formed in the cover plate 3 around the hole 1 and receive a sealing member 11 therein. The receiving groove 20 may include at least a locking protrusion 22 on the inner circumference thereof to retain the sealing member 11 firmly.

In this operation, the sealing member 11 is pressed by the movement of cap 5 between cap 5 and cover plate 3 to seal the space between cap 5 and cover plate 3, thereby preventing oil inside cover plate 3 from leaking outside.

Figure 2:
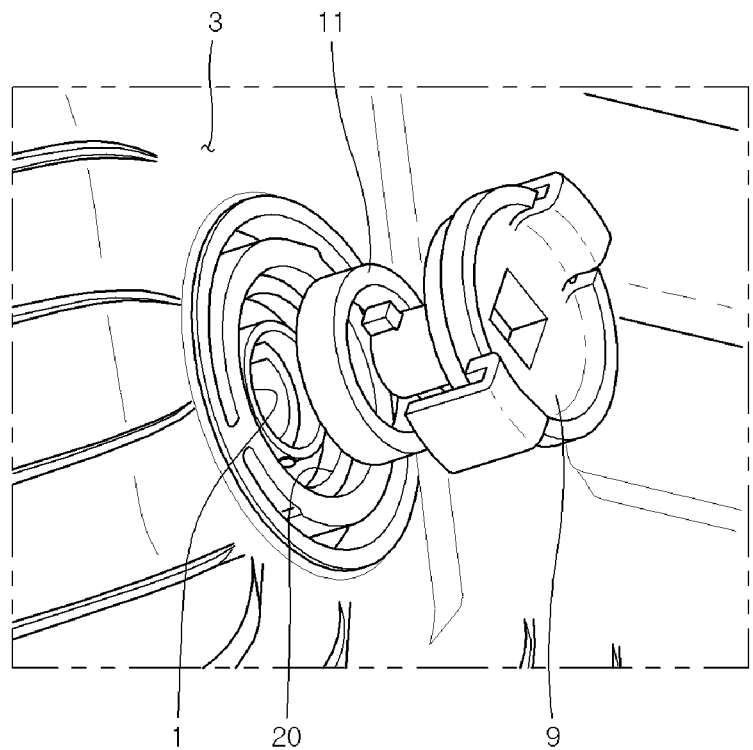
FIG. 2 is a view showing in detail the main parts that are exploded of FIG. 1.
Figure 3:
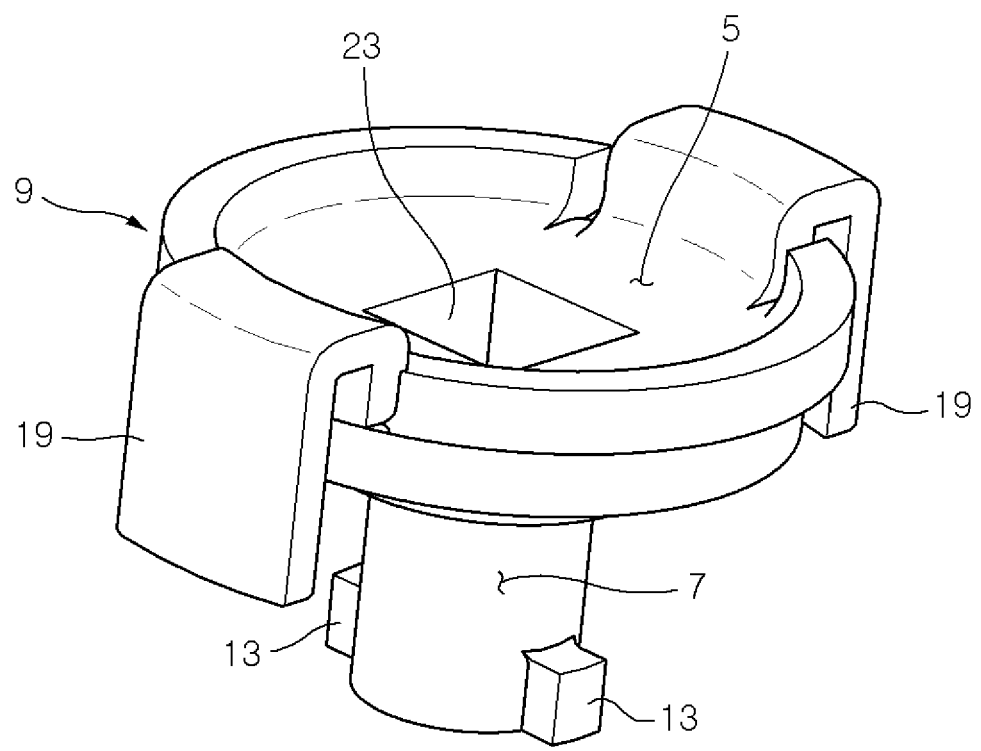
FIG. 3 is a view showing the oil level plug of FIG. 2.
Figure 4:
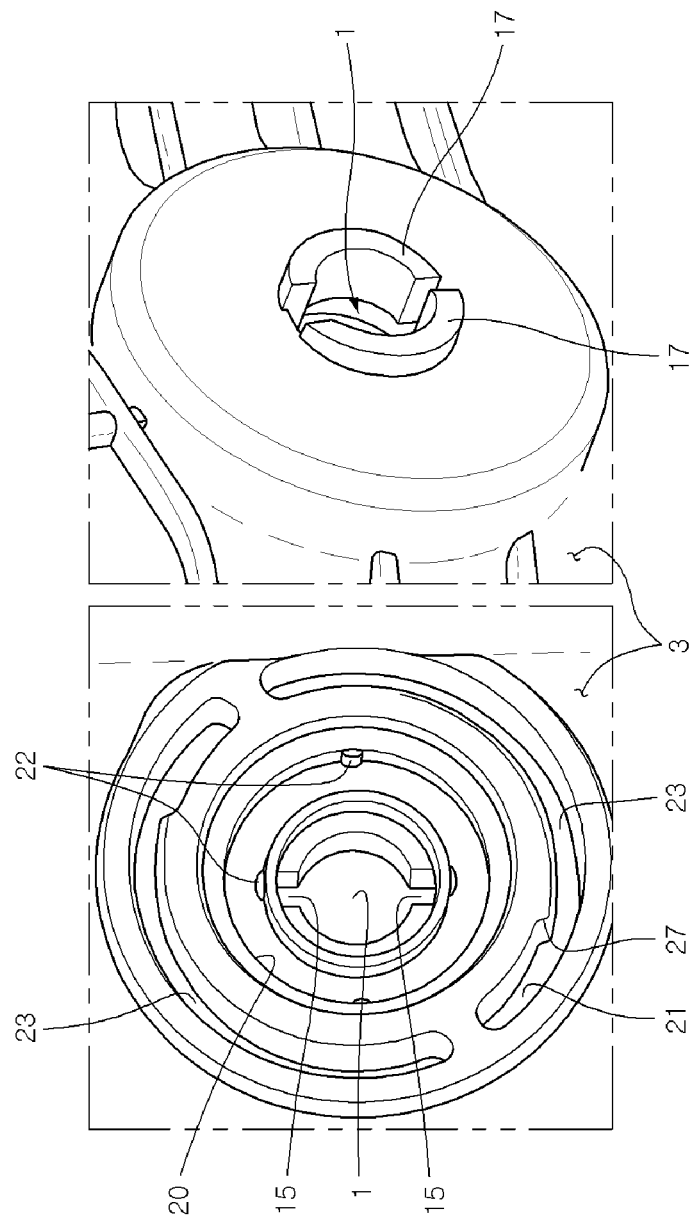
FIG. 4 is a view comparing the inner side and the outside around a hole of a cover plate.

In the present embodiment, sealing member 11 is formed in a ring fitted around the insertion 7, as shown in FIG. 2 to seal the entire circumference of insertion 7 of oil level plug 9 without a gap between insertion 7 and cover plate 3.

Sealing member 11 may be made of the same materials of common sealing parts of the related art, such as rubber or urethane.

In the present embodiment, a rotation range restricting member that restricts the rotation of oil level plug 9 rotating with respect to cover plate 3 within a predetermined range such that locking protrusions 13 spirally move along spiral protrusions 17 is disposed between oil level plug 9 and cover plate 3.

The cover plate 3 includes an arc guide slot 23. The rotation range restricting member has restricting legs 19 protruding from cap 5 to cover plate 3 through the arc guide slot 23 formed to guide the rotational movement of the restricting legs 19 and the arc locking slots 21 formed an end portion of the arc guide slot 23 on cover plate 3 such that restricting legs 19 are inserted and locked therein after a predetermined rotation along the arc guide slot 23.

In an exemplary embodiment of the present invention; the arc guide slot 23 includes a ridge portion 27 such that the thickness of the arc guide slot 23 is smaller than the thickness of the arc restricting slot 21. The restricting leg 19 is elastically biased toward the insertion 7 such that when the restricting legs 19 rotates into the arc locking slots 21 over the ridge portion 27, the restricting leg 19 is snapped thereto.

Cap 5 is formed in a circular plate, restricting legs 19 protrude downward from the outer circumference of circular plate-shaped cap 5 to cover plate 3, and a tool groove 23 is formed at the center of cap 5 to insert a tool and apply rotational force.

Figure 6:
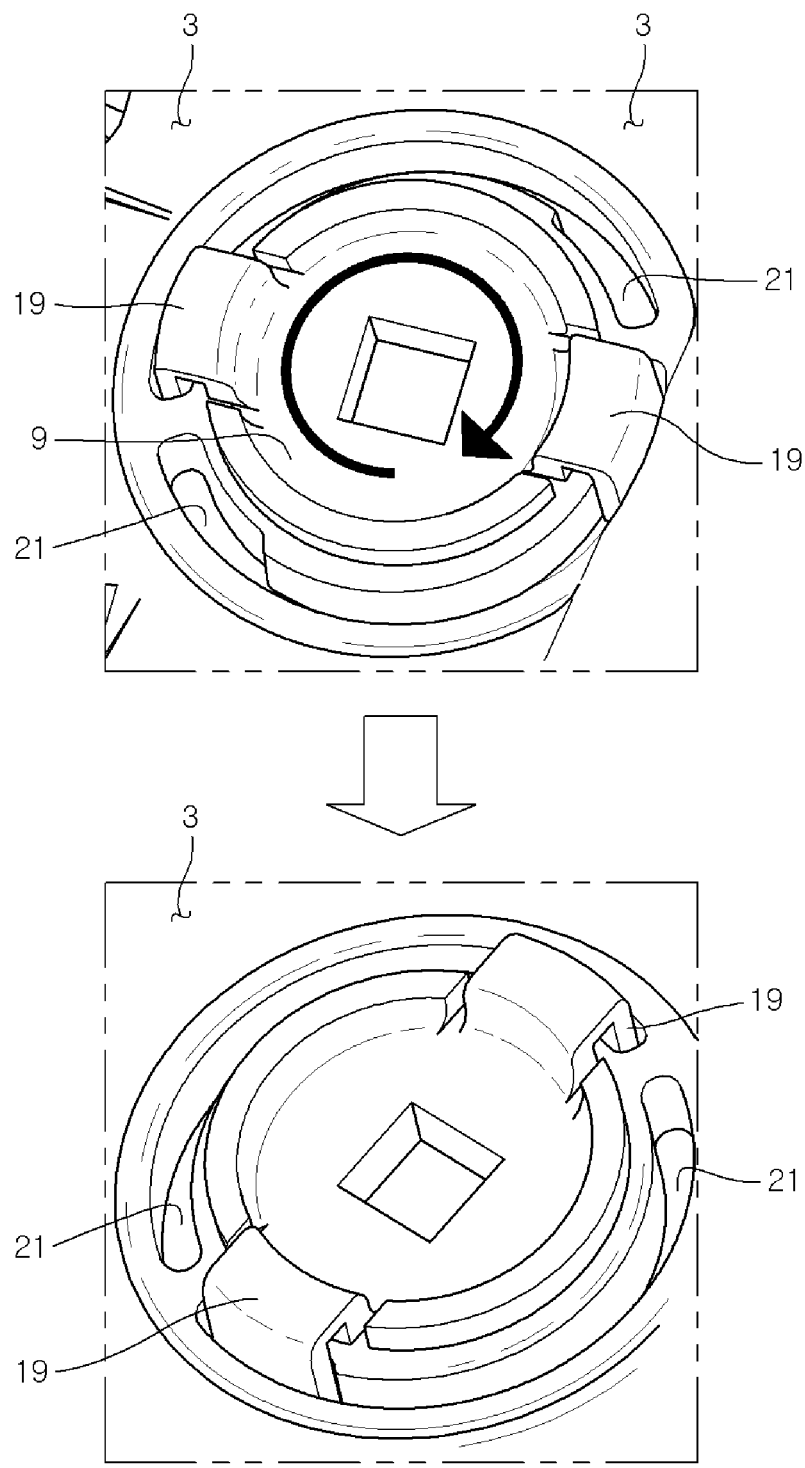
FIG. 6 is a view illustrating the process of mounting the oil level plug to the cover plate.

Therefore, referring to FIG. 6, when insertion 7 is inserted in hole 1, with locking protrusions 13 aligned with receiving holes 15, the position shown at the upper portion of FIG. 6 is achieved, and then, as it is rotated by inserting an appropriate tool in tool groove 23, as shown at the lower portion in FIG. 6, restricting legs 19 rotate and stop within the allowable range of arc locking slots 21. Accordingly, sealing member 11 between cap 5 and cover plate 3 is sufficiently pressed by the rotation and desired sealing is sufficiently achieved.

Meanwhile, tool groove 23 on cap 5 may be modified in a common hex wrench groove or groove that a driver can be inserted in, other than the rectangular groove shown in the figure.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A valve body cover of an automatic transmission, comprising:
    a cover plate having a hole;
    an oil level plug having a cap detachably mounted onto the cover plate from the outside of the cover plate and an insertion extended from the cap and selectively inserted into the hole of the cover plate;
    rotational pressing members formed in the insertion of the oil level plug and the cover plate respectively to press the cap against the cover plate while the insertion of the oil level plug inserted in the hole is rotated relatively with respect to the cover plate; and
    a sealing member which is disposed between the cap and the cover plate and compressed by the cap for sealing a gap formed between the cap and the cover plate while the cap is rotatably coupled to the cover plate;
    wherein the cover plate includes a receiving groove formed along the hole of the cover place to retain the sealing member therein; and
    wherein a locking protrusion is formed on an inner circumference of the receiving groove to couple the sealing member in the receiving groove.

2. The valve body cover of the automatic transmission as defined in claim 1, wherein the sealing member is formed in a ring to be fitted around the insertion.

3. The valve body cover of the automatic transmission as defined in claim 1, wherein the rotational pressing members include:
    a locking protrusion disposed with a predetermined distance from the cap in a longitudinal direction of the insertion and protruding from the insertion radially from the longitudinal direction of the insertion;
    a receiving hole formed in the cover plate and extending from the hole of the cover plate outwards so as to allow the locking protrusion of the insertion to pass through the receiving hole at a predetermined position of the cover plate; and
    a spiral protrusion spirally protruding from the cover plate toward the inside of the cover plate such that the locking protrusion passing through the receiving hole moves toward the inside of the cover plate in the longitudinal direction of the insertion while the locking protrusion of the insertion rotates along the spiral protrusion.

4. The valve body cover of the automatic transmission as defined in claim 3, wherein the spiral protrusion spirally protrudes from the cover plate toward the inside of the cover plate with a predetermined slope with respect to the cover plate along a circumferential direction of the hole.

5. The valve body cover of the automatic transmission as defined in claim 3, further comprising a rotation range restricting member that is disposed between the oil level plug and the cover plate to restrict a rotation of the oil level plug rotating with respect to the cover plate within a predetermined range such that the locking protrusion of the insertion spirally move along the spiral protrusion with the predetermined slope and is mounted to the spiral protrusion.

6. The valve body cover of the automatic transmission as defined in claim 5, wherein the rotation range restricting member has:
    a restricting leg protruding from the cap with a predetermined length; and
    an arc locking slot formed on the cover plate such that the restricting leg is inserted and locked therein to mount the locking protrusion onto the spiral protrusion.

7. The valve body cover of the automatic-transmission as defined in claim 6,
    wherein the rotation range restricting member further includes an arc guide slot which is integrally formed to one end portion of the arc locking slot,
    wherein a ridge portion is formed between the arc guide slot and the arc locking slot to make a thickness of the arc guide slot smaller than the thickness of the arc locking slot, and
    wherein the restricting leg is elastically biased against the ridge portion of the arc guide slot such that the restricting leg sliding along the arc guide slot is locked into the arc locking slot when the restricting leg passes over the ridge portion into the arc locking slot.

8. The valve body cover of the automatic transmission as defined in claim 6, wherein the cap is formed in a circular plate and the restricting leg protrudes downwards from an outer circumference of the cap toward the cover plate with the predetermined length.

9. The valve body cover of the automatic transmission as defined in claim 6, wherein a tool groove is formed approximately at the center of the cap to insert a tool thereto and apply a rotational force to rotate the oil level plug with respect to the cover plate.

* * * * *